(12) United States Patent
McKnight et al.

(10) Patent No.: US 9,954,948 B2
(45) Date of Patent: Apr. 24, 2018

(54) PRIVATE CONTENT DISTRIBUTION NETWORK

(71) Applicant: Microsoft Technology Licensing, LLC, Redmond, WA (US)

(72) Inventors: Gregory Joseph McKnight, Bellevue, WA (US); David Thomas Gauthier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 14/673,682

(22) Filed: Mar. 30, 2015

(65) Prior Publication Data

US 2016/0013980 A1 Jan. 14, 2016

Related U.S. Application Data

(60) Provisional application No. 62/023,767, filed on Jul. 11, 2014.

(51) Int. Cl.
| | | |
|---|---|---|
| *H04L 29/08* | (2006.01) | |
| *H04L 12/24* | (2006.01) | |
| *H04L 29/06* | (2006.01) | |

(52) U.S. Cl.
CPC ...... *H04L 67/1097* (2013.01); *H04L 41/0813* (2013.01); *H04L 63/10* (2013.01); *H04L 67/10* (2013.01); *H04L 67/2842* (2013.01); *H04L 67/2847* (2013.01); *H04L 67/22* (2013.01)

(58) Field of Classification Search
CPC ..... H04L 41/0813; H04L 63/10; H04L 67/10; H04L 67/1097; H04L 67/22; H04L 67/2842; H04L 67/2847

USPC ........................................................ 709/221
See application file for complete search history.

(56) References Cited

U.S. PATENT DOCUMENTS

| | | | |
|---|---|---|---|
| 7,337,219 B1 | 2/2008 | Meenan | |
| 7,359,973 B2 | 4/2008 | Chiles et al. | |
| 7,840,667 B2 | 11/2010 | Weller et al. | |
| 9,516,382 B2* | 12/2016 | Paugh | H04L 12/2812 |
| 2002/0013852 A1* | 1/2002 | Janik | H04L 12/2856 |
| | | | 709/231 |
| 2005/0132183 A1 | 6/2005 | Gearhart | |
| 2007/0168517 A1 | 7/2007 | Weller et al. | |
| 2008/0253564 A1 | 10/2008 | Kahn et al. | |

(Continued)

FOREIGN PATENT DOCUMENTS

EP 2237528 A1 * 10/2010 ......... H04L 12/2812

OTHER PUBLICATIONS

Anonymous, "Network address translation—Wikipedia, the free encyclopedia", Jul. 1, 2014 (Jul. 1, 2014), XP055243097.*

(Continued)

*Primary Examiner* — Michael C Lai
(74) *Attorney, Agent, or Firm* — Rainier Patents, P.S.

(57) ABSTRACT

The description relates to personal content distribution networks. One example can identify devices that are associated with a set of users and that are proximate to a location and obtain operational information about the devices. The example can establish a PCDN for the devices at the location. The PCDN can be configured to obscure identification of the devices to entities outside the PCDN and to aggregate content that may be requested by individual users among multiple individual devices.

20 Claims, 5 Drawing Sheets

(56) References Cited

U.S. PATENT DOCUMENTS

| | | | |
|---|---|---|---|
| 2009/0037553 A1* | 2/2009 | Yuan | G06F 17/30575 709/209 |
| 2010/0211987 A1* | 8/2010 | Chou | H04N 21/2225 725/119 |
| 2013/0031211 A1 | 1/2013 | Johnson et al. | |
| 2013/0036213 A1 | 2/2013 | Hasan et al. | |

OTHER PUBLICATIONS

Yammayap Dot Com ("LAN Based Web Caching, Network Cache, Internet Cache, internet Caching—Vicomsoft", Jul. 5, 2014 (Jul. 5, 2014).*

U.S. Appl. No. 62/023,767 titled "Private CDN" filed Jul. 11, 2014 by Inventor Gregory Joseph McKnight, 19 pages.

Response and Demand filed May 9, 2016 to the International Search Report and Written Opinion dated Jan. 27, 2016 from PCT Patent Application No. PCT/US2015/039461, 13 pages.

International Search Report and Written Opinion dated Jan. 27, 2016 from PCT Patent Application No. PCT/US2015/039461, 24 pages.

Yammayap Dot Com, "LAN Based Web Caching, Network Cache, Internet Cache, Internet Chacing—Vicomsoft", retrieved from <<http://web.archive.org/web/20140705154709/http://vicomsoft.com/learning-center/lan-based-web-caching/>>, on Oct. 19, 2015, Jul. 5, 2014, pp. 4-8, 5 pages.

Anonymous, "Network Address Translation—Wikipedia, The Free Encyclopedia", retrieved from <<http://en.wikipedia.org/w/index.php?title=Network_address_translation&oldid=615116755>> on Jan. 20, 2016, Jul. 1, 2014, pp. 1-3, 3 pages.

Response dated Jun. 24, 2016 to the Second Written Opinion dated Jun. 6, 2016 from PCT Patent Application No. PCT/US2015/039461, 5 pages.

Henry, Alan, "Build Your Own VPN to Pimp Out Your Gaming, Streaming, Remote Access, and Oh Yeah, Security", Published on: Apr. 13, 2012; Available at: <<<http://lifehackercom/5900969/build-your-own-vpn-to-pimp-out-your-gaming-streaming-remote-access-and-oh-yeah-security>>>.

"VirnetX", In White paper of VirnetX, Nov. 10, 2012, 8 pages.

International Preliminary Report on Patentability dated Oct. 20, 2016 from PCT Patent Application No. PCT/US2015/039461, 9 pages.

Second Written Opinion dated Jun. 6, 2016 from PCT Patent Application No. PCT/US2015/039461, 5 pages.

Amended Claims filed Jul. 13, 2017 from Chinese Patent Application No. 201580037808.X, 11 pages.

\* cited by examiner

| AGGREGATION D T 138 | | |
|---|---|---|
| REGISTERED DEVICES 302 | | |
| ID | RESOURCES | |
| ... | ... | |
| 102(1) | 4 GB MEMORY, 0.5 AVAILABLE 1 TERABYTE STORAGE, 700 GB AVAILABLE | |
| 102(2) | 2 GB MEMORY, 1.0 AVAILABLE 250 GB STORAGE, 100 GB AVAILABLE | |
| 102(3) | 32 GB MEMORY, 14.0 AVAILABLE, CELLULAR HOT SPOT | |
| REQUESTED CONTENT 304 | | |
| CONTENT | REQUESTING DEVICE | DATE/TIME |
| ... | ... | ... |
| AA | 102(1) | 9:54 P.M. 1/21/2015 |
| AA | 102(2) | 9:20 P.M. 1/22/2015 |
| BB | 102(2) | 9:20 P.M. 1/22/2015 |
| FETCHED CONTENT 306 | | |
| CONTENT | | DATE/TIME |
| ... | | ... |
| AA | | 9:54 P.M. 1/21/2015 |
| BB | | 9:54 P.M. 1/21/2015 |
| CC | | 9:54 P.M. 1/21/2015 |
| STORED CONTENT 308 | | |
| CONTENT | DEVICE | SAVED DATE/TIME |
| ... | ... | ... |
| AA | 102(1) | 9:54 P.M. 1/21/2015 |
| BB | 102(2) | 9:54 P.M. 1/21/2015 |
| CC1 | 102(2) | 9:54 P.M. 1/21/2015 |
| CC2 | 102(3) | 9:54 P.M. 1/21/2015 |

PCDN COMPONENT 136

FIG. 6

PRIVATE CONTENT DISTRIBUTION NETWORK

PRIORITY

This application is a utility application that claims priority from provisional application 62/023,767 filed Jul. 11, 2014, which is incorporated by reference in its entirety.

BACKGROUND

Traditionally, individual computing devices performed specific roles for a user. For instance, the user may have a desktop computer for work and a tablet for web surfing. The present implementations can allow cooperative use of computing devices to enhance the user experience.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to forming a private or personal content distribution network (PCDN) from or among devices. As used herein devices can include various traditional consumer devices, such as laptops, desktop computers, tablets, and/or routers among others and/or non-traditional devices such as internet of things (IoT) devices. Examples of IoT devices can include TVs, appliances, sensors, automobiles, and/or wearables, among others. The PCDN can be created from and leverage resources of the devices, such as memory, storage, processing, and/or external network (e.g., Internet) bandwidth, among others. The PCDN can be thought of as private in that it can belong to an entity, such as an individual, a family, a business, organization, etc. and can include the entity's devices. From one perspective, the PCDN implementations can use the devices owned by the entity's community of users to form the PCDN. As noted, the community of users could be family members or business or organization members. In some implementations, the PCDN can relate to a specific location, such as the family's house. The devices can participate in the PCDN via one or more wired or wireless local area networks at the location, such as the family's wireless local area network in their home.

The devices can act collectively to fetch, process, and/or store content for the PCDN. Because of the large amount of cumulative resources and general underutilization of the devices and their resources, the PCDN can involve a prediction aspect. The prediction aspect can be used to predict what content users may want and prefetch the content to the PCDN before the content is actually requested by the user on the device. The predictive results can be improved by the fact that the PCDN is associated with a community of users, such as a family. The PCDN can know the family's pattern of device usage and information about what content is consumed on which device and when. Predictions can be used to pre-fetch content for the users. The pre-fetched content can be aggregated among multiple devices of the PCDN such that the amount of content that can be stored is greater than the storage capabilities of individual devices.

From a web search perspective the PCDN can provide enhanced features in that the devices can do both the querying and caching. Furthermore, the PCDN can develop greater personalization in its prediction algorithms to more accurately pre-fetch content compared to public CDNs which must manage many more orders of magnitude of unique traffic profiles. For instance, a group of devices belonging to the family can access content from the internet for use by a family member on one of the devices. The family's PCDN can track this use and make predictions about the family's future use.

The PCDN implementations can offer privacy/security and/or convenience such as enhanced performance and accuracy to the users. The convenience can be manifest as enhanced performance since the PCDN can deal with latency issues by doing smarter caching closer to where the content is used. In regards to privacy/security, the PCDN can make information about the users and the devices of the PCDN less visible to external entities (e.g., entities outside the PCDN).

Figure 1:
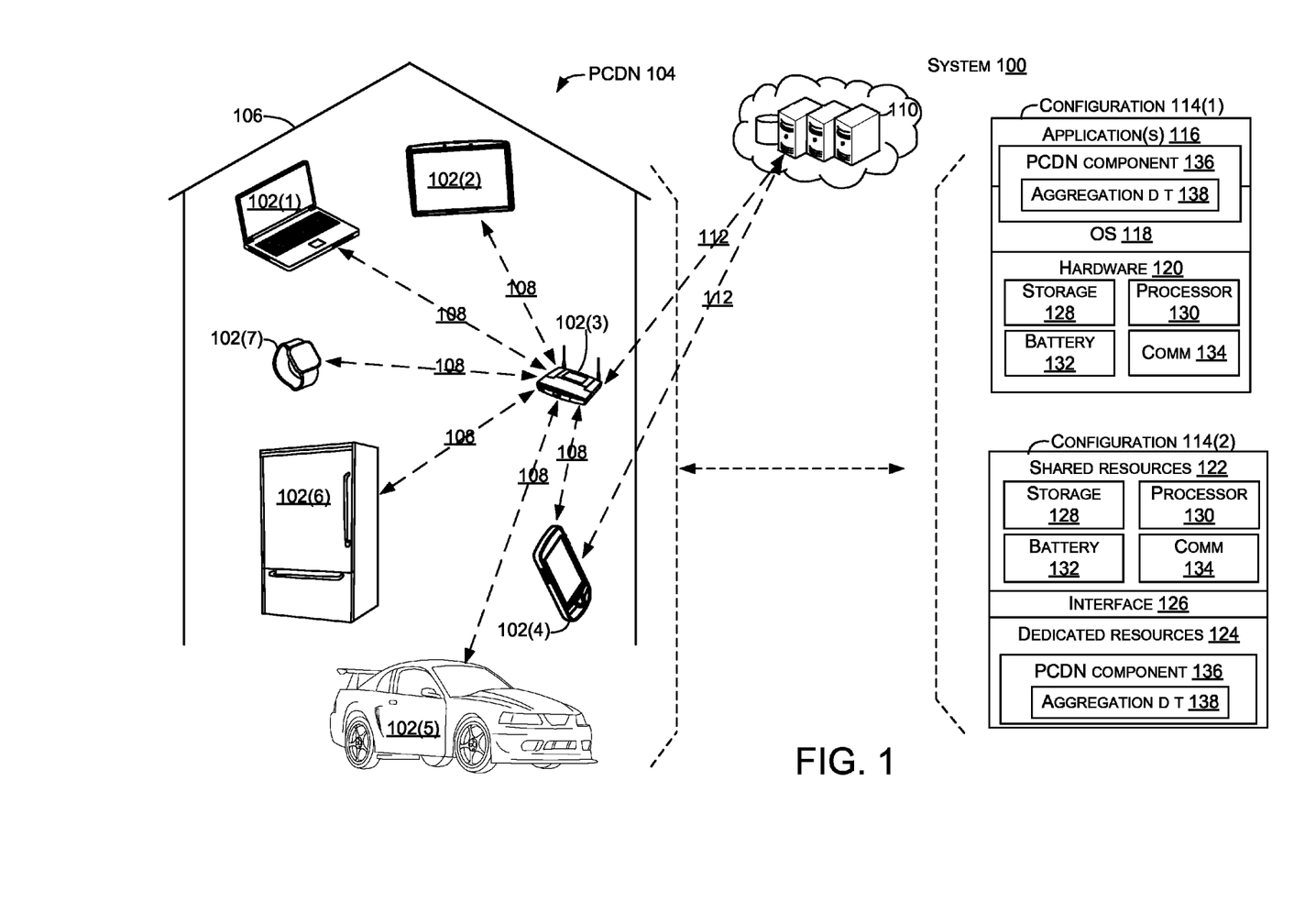
FIG. 1 shows an example system which can accomplish the private content delivery network concepts in accordance with some implementations.

FIG. 1 shows an example system 100 and associated example devices for accomplishing the present PCDN concepts. The system includes multiple devices 102, such as traditional computing devices and/or IoT devices that can contribute to a PCDN 104. The devices can be co-located (at least part of the time), such as at the family's home 106. The devices can communicate over one or more local networks 108 and ultimately can communicate through the PCDN with external devices 110, such as cloud-based devices, via one or more external networks 112.

For purposes of explanation, FIG. 1 shows seven example devices 102. Device 102(1) is manifest as a laptop or notebook type computer, device 102(2) is manifest as a tablet type computer, device 102(3) is manifest as a wireless router, device 102(4) is manifest as a smart phone type computer, device 102(5) is manifest as a car (or a portion of a car), device 102(6) is manifest as an appliance, in this case a refrigerator, and device 102(7) is manifest as a wearable device, in this case a smart watch. For discussion purposes, devices 102(1)-102(4) can be thought of as traditional computing devices, whereas device 102(5)-102(7) can be thought of as IoT devices. The examples shown in FIG. 1 are not meant to be limiting and any of a wide variety of types of devices could be included in a PCDN system.

FIG. 1 shows two device configurations 114. Individual devices 102 can employ either of configurations 114(1) or 114(2), or an alternate configuration. Briefly, configuration 114(1) represents an operating system centric configuration. Configuration 114(2) represents a system on a chip (SOC) configuration. Configuration 114(1) is organized into one or more applications 116, operating system 118, and hardware 120. Configuration 114(2) is organized into shared resources 122, dedicated resources 124, and an interface 126 there between.

In either configuration 114, the device can include storage/memory 128, a processor 130, a battery (or other power source) 132, a communication component 134, a PCDN component 136 and/or an aggregation data table 138.

The communication component 134 can allow individual devices 102 to communicate with various other devices 102 and/or 110. The communication component can include a receiver and a transmitter and/or other radio frequency circuitry for communicating via various technologies, such as cellular, Wi-Fi (IEEE 802.xx), Bluetooth, Ethernet etc. Alternatively, the communication component can include or work cooperatively with a modem to allow connection to a physical line, such as a cable line, fiber line, DSL, etc. Thus, the communication component can function to provide an Internet access point for communication from the PCDN 104 to external entities. Stated another way, the communication component can interact with service provider(s) resources so that bandwidth of the service providers can be utilized to access external entities.

In some configurations, each of devices 102 can have an instance of the PCDN component 136. The PCDN components 136 may be configured to operate in a central, master-and-slave, and/or peer-to-peer configuration. For instance, in some configurations, an individual device, such as a wireless router or personal computer can assume the central role. This consumer device can identify and control the other consumer devices of the PCDN 104. In some cases, each consumer device can have full capabilities to satisfy a given role at a particular time. In other cases, some consumer devices, such as resource constrained devices such as IoT devices like wearable devices or appliances, may only be able to act as slave devices and not as master devices. Stated another way, each device of the PCDN may have a PCDN component, but the functionalities that can be performed by individual PCDN components may be the same or different from other PCDN components. These aspects are discussed in more detail below relative to FIG. 2.

In some implementations the PCDN component 136 can include and/or access the aggregation data table 138 to facilitate content related tasks. For instance, any time content is requested by a device within the PCDN 104, the PCDN component 136 can determine from the aggregation data table 138 whether the content is already on the PCDN 104 (e.g., stored on one of the devices 102 or aggregated across multiple devices 102 of the PCDN). If the content is already on the PCDN, then the PCDN component 136 can cause the content to be sent from its stored location to the requesting device 102. If some or all of the requested content is not on the PCDN, the PCDN component 136 can create or utilize a generic requesting device identification that is utilized to fetch the content externally from the PCDN. For instance, assume for purposes of explanation that device 102(3) is functioning in a master role for the PCDN and that the content request came from device 102(7) acting in a slave role. The PCDN component 136 of the master device 102(3) can utilize its own internet protocol (IP) address (or a virtual IP address) for communications external to the PCDN. Upon receipt of the content the PCDN component 136 of the master device 102(3) can provide the content to the requesting device 102(7). By handling all content requests that leave the PCDN in a similar manner, the PCDN component 136 of the master device 102(3) can mask private information about the devices of the PCDN and the content consumption habits of the user(s) of those devices from outside entities. Further, the PCDN component 136 can further mask the consumption information by fetching additional content (that includes the requested content) in the external request. This strategy can further obfuscate information about family members' media consumption habits on the PCDN from the external entities.

Further still, the PCDN component 136 can attempt to prefetch content before it (e.g., the content) is actually requested by one of the devices 102 of the PCDN 104. The prefetched content can be indexed in the aggregation data table 138. For instance, the aggregation data table 138 can list what content is available on the PCDN, when it was obtained/updated, the device(s) upon which the content is stored, etc. The PCDN component 136 can decide which device or devices to store the content based upon various factors, such as available resources of the individual devices. Details of an example where the devices report information about their resources is described below relative to FIG. 2, and details of an example aggregation data table are described below relative to FIG. 3.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 102 can include traditional computing devices, such as personal computers, desktop computers, notebook computers, cell phones, smart phones, personal digital assistants, pad type computers, mobile computers, cameras, appliances, smart devices, IoT devices, etc. and/or any of a myriad of ever-evolving or yet to be developed types of computing devices. Aspects of the system 100 can be manifest on a single device 102 or distributed over multiple devices 102.

As mentioned above, configuration 114(2) can be thought of as a system on a chip (SOC) type design. In such a case, functionality provided by the device can be integrated on a single SOC or multiple coupled SOCs. One or more processors 130 can be configured to coordinate with shared resources, such as memory/storage 128, etc., and/or one or more dedicated resources 124, such as hardware blocks configured to perform certain specific functionality. Thus, the term "processor" as used herein can also refer to central processing units (CPUs), graphical processing units (CPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 2:
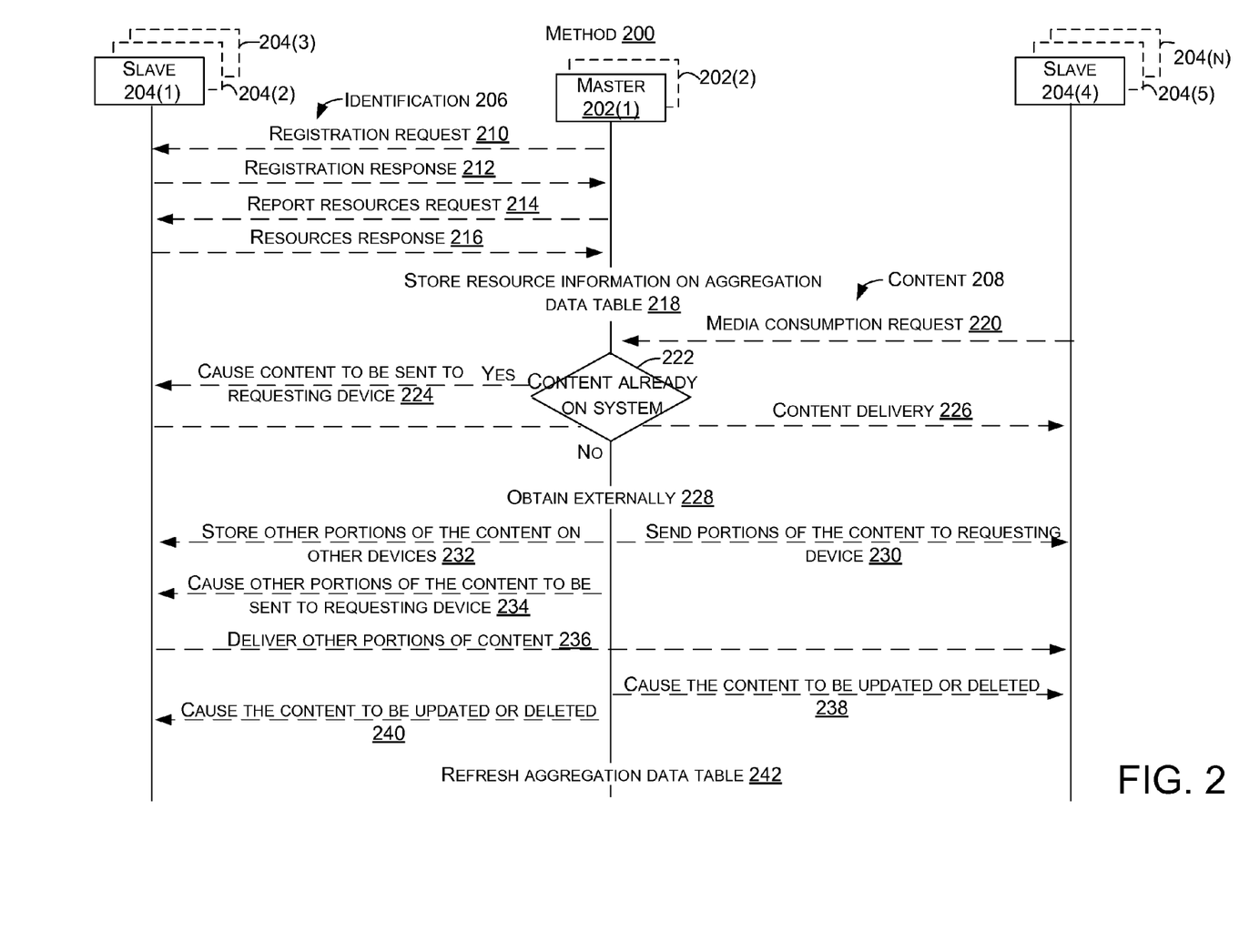
FIG. 2 shows an example private content distribution network method in accordance with some implementations.

FIG. 2 shows an example method 200 that can be performed by individual devices 102 (FIG. 1) functioning in master 202 and/or slave 204 roles. Method 200 can include an identification sub-method 206 and a content related sub-method 208.

The identification sub-method 206 allows individual devices 102 to self-identify on a network established by the master(s). The method can involve a registration request 210. As illustrated, the registration request can be initiated by the master 202. Alternatively, the registration request can be initiated by the slave 204. In the illustrated configuration, a registration response can be returned at 212. A report resources request can be generated at 214. A resources response can be generated at 216. For instance, the resource response can list various resources of the slave 204. For example, the slave can report processing, memory, storage, bandwidth, etc. Further, multiple parameters can be reported for each resource. For example, the resource response may indicate a 2 GHz processor with 0.5 GHz being used and 1.5 GHz available. Similarly, storage may be 1 Terabyte with 400 Gigabytes available. The resource information can be stored in an aggregation data table at 218. (An example aggregation data table is described in more detail below relative to FIG. 3.)

In some configurations, the registration can leverage existing network identification protocols (e.g., Wi-Fi self-identification, universal plug and play (UPnP) identification (devices 102 self-identify with device model information), digital living network alliance (DNLA), etc. to create and monitor an instance of the PCDN 104. In other cases, the consumer devices can maintain a metadata page, such as an XML file, of its capabilities that gets registered by the PCDN component 136.

The network protocol(s) can allow devices 102 to share their resources, capabilities, configurations, etc. For instance, Wi-Fi compliant devices can share their resource capabilities in their beacon signal. UPnP compliant devices can share a link to their capabilities. The method 200 can then leverage these capabilities in relation to content-related sub-method 208.

For purposes of explanation, the discussion of content-related sub-method 208 arbitrarily starts with a media consumption request 220 from an individual slave 204 to the master 202. For purposes of explanation, assume that the requesting slave is an IoT TV that a user is trying to watch a movie (e.g., the content) on. The master can determine whether the content is already on the system at 222. For instance, the master can maintain or access an aggregation data table 138 (FIG. 1) that lists content stored on the system and its location (which device the content is stored on). In an instance where the content is already on the system (e.g., yes at 222), the master can cause the content to be sent to the requesting device (e.g., slave) at 224. As mentioned above, the content may be stored on a single device of the system or portions of the content be spread over multiple system devices (e.g. aggregated content storage). The content can be delivered to the requesting device at 226.

In an instance where the content is not already on the system (e.g., 'no' at 222) the master can obtain the content externally (e.g. over the Internet) at 228. The obtained content may simply be forwarded to the requesting device. However, in some instances the master may take various actions to enhance system performance. For instance, the master may send some portions of the content to the requesting device at 230 and store other portions on other system devices at 232. For example, in the movie context, assume that the movie content is presented on the TV at a rate x and that the master has external bandwidth of 2x. If little or no bandwidth is being utilized for other purposes the master may fetch the content at 2x and send some of the content directly to the TV and store (or otherwise buffer) the remainder on other system devices. If the master receives other content requests, the master can throttle the fetch rate of the movie without disruption to the user by utilizing the cached portions so that these other requests can be satisfied. As the content is received, the master can send portions of the content, such as blocks to individual devices in an aggregated manner. For instance, the master can send block 1 to the requesting device so that presentation of the movie can begin, the master can send block 2 to a second device, block 3 to a third device, and so on. The master can record this information in the aggregation data table 138. As block 2 is needed by the requesting TV, the master can cause block 2 to be sent to the requesting TV from the second device. The master can also determine whether to maintain block 2 on the second device or delete it, such as based upon predictions of future use. In this way, content can be prefetched and aggregated within the PCDN 104 in amounts that might otherwise exceed the storage capacity of the TV (or any individual device of the PCDN). Thus, subsequent network constraints are less likely to cause an interruption to the movie since the content is stored within the PCDN. Further, the prefetching and aggregated storage can allow other content requests to be achieved externally without bandwidth issues because the prefetched content can allow the PCDN to temporarily obtain the movie content at a rate that is less than the playback rate while the other request is satisfied.

In another scenario, two or more devices can cooperatively perform master roles. For instance, a wireless router and a smart phone (e.g., device 102(3) and 102(4) of FIG. 1) may be cooperatively performing the master role. The wireless router can be connected to a modem (or include a modem component) that functions as an Internet access point via a physical connection (e.g., cable, fiber, or DSL). Thus, the wireless router can interface with a service provider, such as a cable company, to access the Internet over a first network. The smart phone can provide an Internet access point via cellular capabilities. Thus, the smart phone can interface with a service provider, such as a cellular service provider, to access the Internet over a second network. The movie content may be predominately obtained over the physical connection by the wireless router. However, if a flurry of data is requested by PCDN devices that is not available on the PCDN 104, the cooperative masters may utilize both the bandwidth available on the physical line as well as cellular bandwidth available to the smart phone.

The master 202 can also track and manage the content usage. For instance, in the movie scenario, the master can instruct other system devices to send the other portions to the requesting device at 234 to avoid delay for the user. For instance, the master can track the movie being presented on the TV and cause the content to be sent to the TV to ensure continuous movie play. These other content portions can be delivered at 236 to the requesting slave device. The master can also review the aggregation data table 138 (FIG. 1) and make decisions regarding content stored on the system. For instance, the master can predict a likelihood that the user will watch the movie again within a predefined time, such as a couple hours and keep the content stored on the PCDN 104 for that time. For example, this user may commonly start a movie on Friday nights on the TV in the family room and then turn it off and restart it on the tablet in the bedroom. Based upon the predictions, the master can cause the content to be updated or deleted from the requesting device at 238 and/or the other PCDN devices at 240. The master can update the aggregation data table at 242.

Thus, continuing with the above mentioned TV example, if the user turns off the movie on the family room TV and turns it in on another TV or device, the movie can continue in an uninterrupted fashion since the master maintained the movie content on the PCDN 104. The master can receive a request from the second device and cause the content to be delivered to the second device from various PCDN devices that may be storing portions of the movie. In summary, in one implementation, the PCDN component 136 (FIG. 1) operating on individual devices can allow the individual devices to perform master and/or slave roles as described above.

The PCDN component 136 (FIG. 1) can track the users' content consumption history as well as explicit user instructions and/or PCDN device information to make predictions about future content consumption and obtain and store the content in an aggregated manner on the PCDN devices. For example, assume that one of the devices is a smart phone that has very little available storage resources and another one of the devices is a notebook computer with lots of available storage. Assume further that the user performs lots of internet searches on the smart phone. The PCDN component could cache search results for the smart phone on the notebook computer within the PCDN 104 for subsequent transfer to (and/or use by) the smart phone. Further, assume that the user tends to browse recipes. The PCDN could actively send recipe temperature information to the range and ingredient lists to the refrigerator. Alternatively, even if the range and refrigerator are storage constrained and don't have room to store the content, the PCDN could predict that these appliances (e.g., the range and the refrigerator) will request this content and keep the content stored on one or more devices of the PCDN so that these subsequent content requests can be handled within the PCDN rather than having to be obtained externally.

In relation to FIGS. 1 and 2, in the centralized or master configuration, an instance of the PCDN component 136 on an individual device 102, such as the router, can collect the metadata for the resources of each participating PCDN device. The PCDN component of the central device can collect the metadata together into a listing of pooled resources and can tier those resources in that pool. The central PCDN component can figure out how to send workload out to the individual devices based upon the tiered pool.

Further, the central PCDN component 136 can be privy to the IP addresses that are submitted to leave the PCDN 104 and access the Internet. Alternatively or additionally to hiding the IP addresses of the individual devices as mentioned above, the central PCDN component can monitor for IP address hits, and parallel snoop all of the content that comes from the external resources and cause that content or related content to be stored locally on the PCDN in an aggregated manner to leverage under-utilized PCDN resources of the various devices. The central PCDN component can then manage the stored content based upon user profiles or coherent mechanisms.

In a distributed configuration, the various PCDN components 136 can employ a negotiation or arbitration policy to decide how to distribute workload.

Further the PCDN components 136 can learn information about the group of consumers (e.g., the family members). The PCDN components can then take actions to protect the security and/or privacy of the family of the consumers. For instance, the PCDN components can store the profile information within the participating devices in the home.

In some implementations, the PCDN components 136 can analyze the information and make predictions about what new content the family of consumers (and/or individual family members on individual devices) might want. The PCDN components can then go and get that content in advance and have it available upon demand within the PCDN 104. From one perspective, the view of the PCDN is specifically for the usage of the "family," therefore it has much more accurate information to use for predicting and prefetching content that is more likely to be of use to the family. This aspect will improve performance over existing technologies.

In some configurations, the PCDN components 136 can be thought of as providing a recommendation engine for the family of consumers and then bridging between the PCDN 104 and the outside networks, public CDNs, and/or the internet. As mentioned above, the PCDNs can distribute tasks among the participating devices. In this case, the PCDNs may utilize devices such as personal computers, gaming/entertainment consoles, and/or tablets that have relatively high processing resources to accomplish the recommendation engine. For instance, personal computers may be under-utilized when the consumers are gone and/or asleep. The PCDN components could assign processing resources on these consumer devices to the recommendation engine functionality during these periods of under-utilization. In some configurations, the recommendation engine can provide real time prediction and caching. For instance, the recommendation engine can run while the consumer is browsing and predict the consumer's next browser page and prefetch it.

Alternatively or additionally, the recommendation engine can run when resources are available, such as at night and cache content based upon what the consumers did the day before. Some implementations could allow the user to specify, such as via a GUI, the priority given to the recommendation engine aspect of the PCDN 104. If the user ranks the recommendation engine relatively high, then real-time caching may be available in most or all circumstances. If the user ranks the recommendation engine lower, caching may only occur during low utilization periods, such as when the consumers are asleep. Further, because of the shared resources offered by the PCDN, the recommendation engine can produce real-time prediction that might not be possible on a single device due to resource constraints. For instance, assume that the user is surfing the web on their smart phone.

In this scenario, the PCDN 104 may allocate idle processing resources on the user's personal computer and/or several other consumer devices in the house to provide real-time prediction and pre-fetching (e.g., caching) that could not be performed by the resources on the smart phone. The PCDN is also customized to the family of users and thus can achieve a predictive efficiency that exceeds the ability of a public CDN.

Regarding privacy, the PCDN 104 can obfuscate much information about the users to external entities, such as search engines and content providers. For instance, the ability of the PCDN to maintain profile information internally and shroud or blur the profile information available to the public CDNs and external networks can enable the family members to keep much or most of their browsing history, page view duration, and profile and security content within the PCDN. For instance, the frequency and duration that family members view individual web pages (e.g., page views) can be hidden by the PCDN from public cloud capture. The PCDN could also affirmatively take actions to make the user profiles more opaque to the outside world. For instance, at times of resource under-utilization, the PCDN components 136 could fetch content from random or specific web-sites. For example, the PCDN component could randomly download content from 'cnn.com' and 'foxnews.com' to cloud profile information configured by outside entities. (Real web-sites are utilized here to provide meaningful examples. The assignee of this patent is not making any assertion of ownership or affiliation to these web-sites).

Regarding security, the PCDN 104 can reduce exposure of personal information, security keys, etc. to external entities. For instance, the number of interactions between individual devices and external entities can be reduced through prefetching and/or aggregated caching within the system so that fewer content requests are made to the external requests. Further, the content requests that are made can be genericized to mask the content of interest. Further, the large amount of aggregated resources available within the PCDN can decrease reliance on external entities to store the users' content including private information. Thus, this private content can stay within the PCDN and out of the reach of outside entities.

Figure 3:
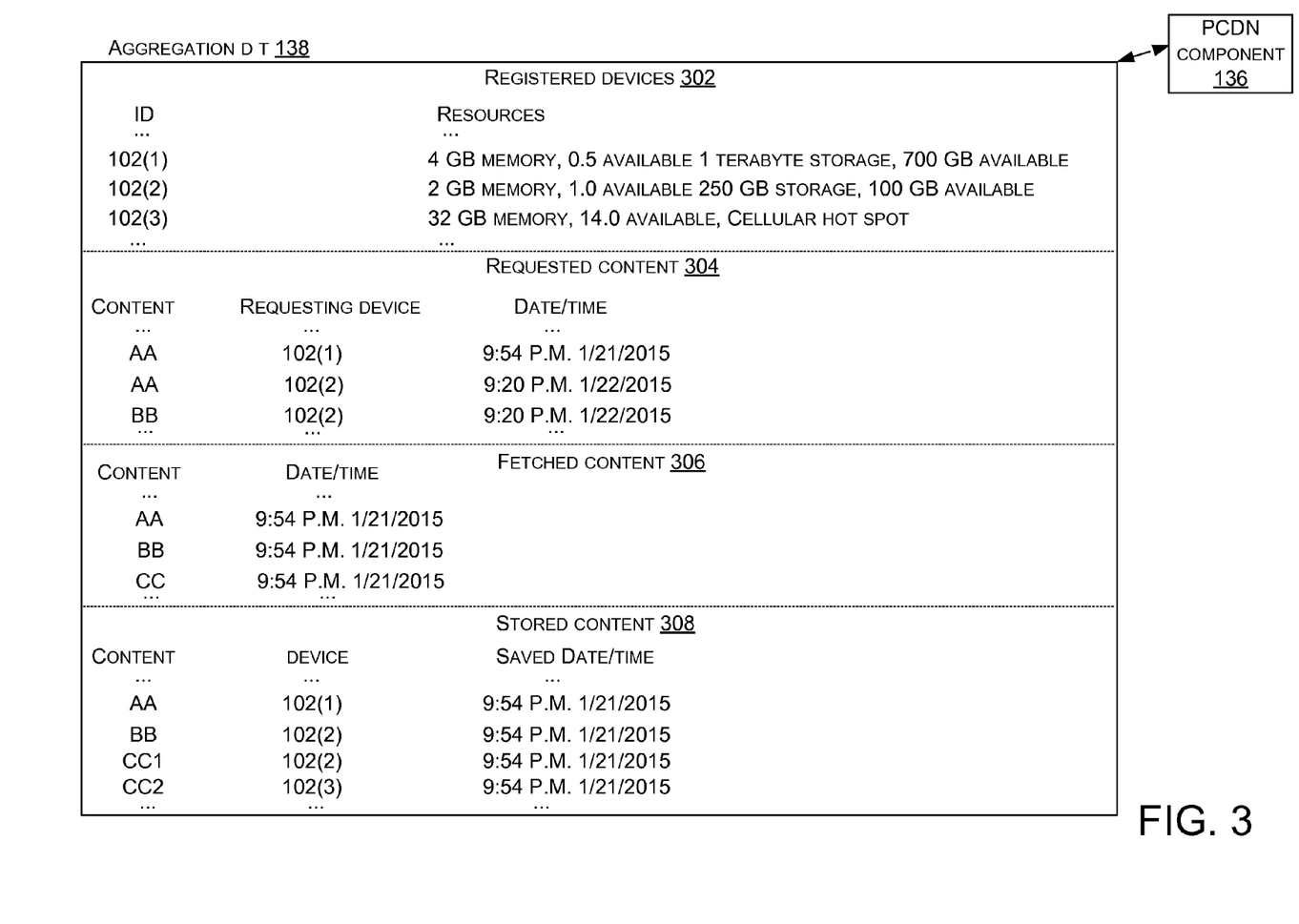
FIG. 3 shows an example aggregation data table in accordance with some of the present implementations.

FIG. 3 shows an example aggregation data table 138. The aggregation data table can list various types of information about the PCDN devices 102 and/or content. In this case, the aggregation data table includes registered devices section 302, requested content section 304, fetched content section 306, and stored content section 308.

The registered devices section 302 can have columns that list the identification (ID) of each device 102 and resources of the device. The requested content section 304 has columns for content (hypothetical content 'AA' and 'BB'), requesting device (e.g., device that requested the content), and date/time that the content was requested. The fetched content section 306 lists content that was fetched externally from the PCDN 104 and the date and time the content was fetched. Finally, the stored content section relates content to the PCDN device that the content is stored on, and the date/time that the content was saved on the device (e.g., within the PCDN).

The PCDN component 136, such as the PCDN component of an individual device or devices acting in the master role, can maintain the data in the aggregation data table 138 as well as use the data in managing the PCDN 104. For instance, in this case, assume that a user using device 102(1) requested content AA at 9:54 P.M. on Jan. 21, 2015. The PCDN component obtained content AA, BB, and CC from external entities. The PCDN component can utilize multiple parameters to determine to obtain the extra content. First, the PCDN can predict that the user will request some of this additional content at a subsequent time (which in fact occurred at 9:20 P.M. the next day according to the requested content section 304). Second, the PCDN can determine that it has sufficient bandwidth and/or storage resources available to obtain the extra content (which it did according to the registered devices section resources (bandwidth not shown in this example but discussed above). Third, the PCDN can request additional content to obfuscate the content consumption patterns of the users of the PCDN. Any combination of these and/or other parameters can be considered by the PCDN component in deciding what content to fetch and when to fetch it.

The PCDN component 136 can aggregate content among multiple devices as indicated in the stored content section 308 where content CC is stored as portion CC1 on device 102(2) and portion CC2 on device 102(3). Thus, the PCDN 104 knows where to find the content and can have the content sent from the multiple storage locations to a subsequent requesting device 102 of the PCDN based upon the stored content section 308. Further, as subsequent content is requested, the PCDN component can check the stored content section 308 to see if the content is already on the PCDN before obtaining the content externally (e.g., from an external entity).

Example Techniques

Figure 4:
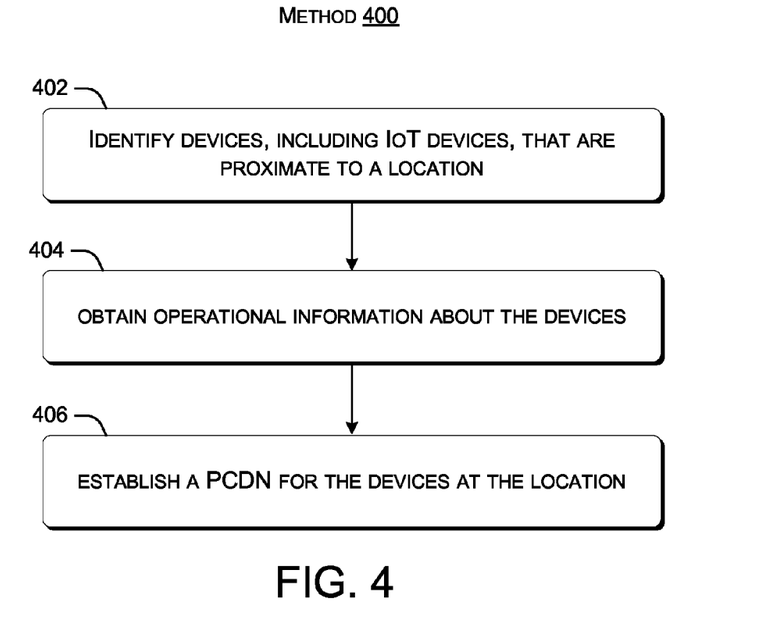
FIGS. 4-6 show example flowcharts in accordance with some implementations of the present concepts.

FIG. 4 illustrates a flowchart of a PCDN technique or method 400.

At block 402, the method can identify devices that are proximate to a location. For instance, the location can be a home or a business. The location can also be defined as being associated with a local area network, such as may be established by a wireless router in the users' home. In some cases the devices can be identified on a wireless local area network via their identification information to the network. In some cases, the devices could belong to members of a family and an individual family member has provided network passwords to allow the devices to be authenticated on the network.

At block 404, the method can obtain operational information about the devices. The operational information can be obtained directly from the devices or from a site that maps devices and operational information, such as device model, processor, storage capacity, etc.

At block 406, the method can establish a PCDN for the devices at the location. Establishing the PCDN can be handled by an individual device or in a distributed manner negotiated by the devices.

Figure 5:
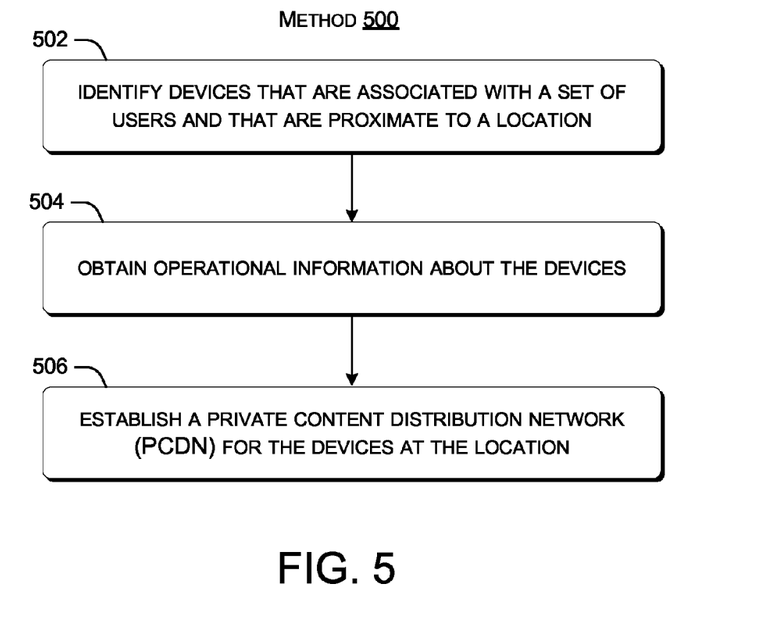

FIG. 5 illustrates a flowchart of a PCDN technique or method 500.

At block 502, the method can identify devices that are associated with a set of users and that are proximate to a location.

At block 504, the method can obtain operational information about the devices.

At block 506, the method can establish a private content delivery network (PCDN) for the devices at the location. The PCDN is configured to obscure identification of the devices to entities outside the PCDN and to aggregate content that may be requested by individual users among multiple individual devices.

Figure 6:
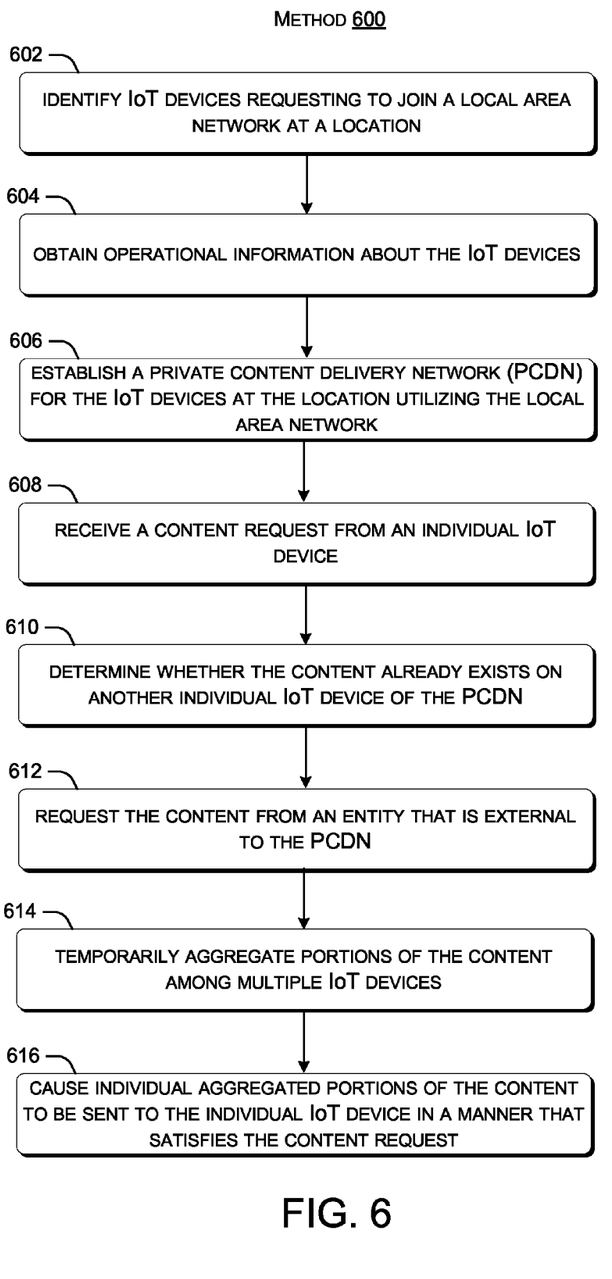

FIG. 6 illustrates a flowchart of another PCDN technique or method 600.

At block 602, the method can identify IoT devices requesting to join a local area network at a location.

At block 604, the method can obtain operational information about the IoT devices.

At block 606, the method can establish a private content delivery network (PCDN) for the IoT devices at the location utilizing the local area network.

At block 608, the method can receive a content request from an individual IoT device.

At block 610, the method can determine whether the content already exists on another individual IoT device of the PCDN.

At block 612, the method can in an instance where the content does not already exist on the PCDN, request the content from an entity that is external to the PCDN. The external request does not disclose information about the individual IoT device.

At block 614, the method can temporarily aggregate portions of the content among multiple IoT devices.

At block 616, the method can cause individual aggregated portions of the content to be sent to the individual IoT device in a manner that satisfies the content request.

The described methods can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

ADDITIONAL EXAMPLES

Various examples are described above. Additional examples are described below. One example is manifest as a method performed by one or more computing devices. The method can identify Internet of Things (IoT) devices requesting to join a local area network at a location and can obtain operational information about the IoT devices. The method can establish a private content delivery network (PCDN) for the IoT devices at the location utilizing the local area network and can receive a content request from an individual IoT device. The method can determine whether the content already exists on another individual IoT device of the PCDN. In an instance where the content does not already exist on the PCDN, the method can request the content from an entity that is external to the PCDN. The requesting does not disclose information about the individual IoT device. The method can temporarily aggregate portions of the content among multiple IoT devices and cause individual aggregated portions of the content to be sent to the individual IoT device in a manner that satisfies the content request.

Another example can include any combination of the above and/or below examples where the determining whether the content already exists on another individual IoT device of the PCDN comprises referencing an aggregation data table associated with the PCDN and determining if the content or a portion of the content is indexed on the aggregation data table.

Another example can include any combination of the above and/or below examples where the requesting the content from the entity that is external to the PCDN comprises requesting the content utilizing an internet protocol (IP) address that is not associated with the individual IoT device.

Another example can include any combination of the above and/or below examples further comprising determining a likelihood that the content will be requested again within a defined period of time by the individual IoT device or another individual IoT device of the PCDN, and further comprising determining whether to maintain the temporarily aggregated portions based upon the likelihood.

Another example can be manifest as one or more computer-readable storage media having computer-executable instructions that, when executed by a processor of a device, cause the device to perform a method. The method can identify devices that are associated with a set of users and that are proximate to a location and can obtain operational information about the devices. The method can establish a private content delivery network (PCDN) for the devices at the location. The PCDN is configured to obscure identification of the devices to entities outside the PCDN and to aggregate content that may be requested by individual users among multiple individual devices.

Another example can include any combination of the above and/or below examples where the identifying devices comprises identifying devices registering on a local area network employed by the PCDN.

Another example can include any combination of the above and/or below examples where the local area network and the devices are controlled by a single entity or wherein at least some of the devices are controlled by a service provider and operated on behalf of the single entity.

Another example can include any combination of the above and/or below examples where the single entity is a family, or wherein the entity is an organization.

Another example can include any combination of the above and/or below examples further comprising analyzing user activities on an individual device of the PCDN and predicting future content usage based upon the activities and attempting to prefetch the future content.

Another example can include any combination of the above and/or below examples further comprising analyzing activities of an individual user across multiple devices and predicting future content usage based upon the activities and attempting to prefetch the future content.

Another example can include any combination of the above and/or below examples further comprising storing the prefetched content in an aggregated manner over multiple of the devices of the PCDN.

Another example can include any combination of the above and/or below examples where the PCDN comprises a wired or wireless local area network.

Another example can include any combination of the above and/or below examples where the PCDN comprises multiple Internet access points.

Another example can include any combination of the above and/or below examples where the multiple Internet access points include a physical Internet access point and a cellular Internet access point.

Another example is manifest as a system. The system can include a processor and storage. The system can also include an aggregation data table stored on the storage and that lists content stored on devices of a private content delivery network (PCDN) and a PCDN component that is executed by the processor and is configured to receive content requests from individual devices of the PCDN and to access the aggregation data table to determine whether the content is stored within the PCDN. In an instance where the content is not stored on the PCDN, the PCDN component is configured to obtain the requested content as a sub-set of retrieved content and to update the aggregation data table to reflect the retrieved content.

Another example can include any combination of the above and/or below examples embodied on a single device or wherein the aggregation data table is manifest on a first device and the PCDN component is manifest on a second different device.

Another example can include any combination of the above and/or below examples where the single device is one of the devices or wherein the single device is not one of the devices.

Another example can include any combination of the above and/or below examples where the single device has access to another network over which to obtain the retrieved content.

Another example can include any combination of the above and/or below examples where the PCDN component functions in a master role and the devices function in a slave role.

Another example can include any combination of the above and/or below examples where the PCDN component comprises a first instance of the PCDN component that can work cooperatively with another instance of the PCDN component on another device in a shared master role.

Another example can include any combination of the above and/or below examples manifest as a single device that includes both a modem component and a router component.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed by one or more computing devices, the method comprising:
   identifying Internet of Things (IoT) devices requesting to join a local area network at a location;
   obtaining operational information about the IoT devices;
   establishing a private content delivery network (PCDN) for the IoT devices at the location utilizing the local area network;
   receiving a request for content from a requesting IoT device;
   determining whether the content already exists on the PCDN;
   in an instance where the content does not already exist on the PCDN, obtaining the content from an entity that is external to the PCDN without disclosing information about the requesting IoT device to the entity that is external to the PCDN;
   dividing the content into blocks;
   storing different blocks of the content among different IoT devices; and, satisfying the request for content by causing individual blocks of the content to be sent to the requesting IoT device, while buffering remaining individual blocks of the content among the different IoT devices until the remaining individual blocks of the content are subsequently sent to the requesting IoT device.

2. The method of claim 1, wherein the determining whether the content already exists on the PCDN comprises referencing an aggregation data table associated with the PCDN and determining if the content or a portion of the content is indexed on the aggregation data table.

3. The method of claim 1, wherein the obtaining the content from the entity that is external to the PCDN comprises requesting the content utilizing an internet protocol (IP) address that is not associated with the requesting IoT device.

4. The method of claim 1, further comprising:
   based at least in part upon a pattern of device usage of the IoT devices, making a prediction whether the content will be requested again within a defined period of time by the requesting IoT device or another individual IoT device of the PCDN; and
   determining whether to maintain the blocks of the content on the PCDN based at least in part upon the prediction.

5. A system, comprising:
   a processor and storage;
   an aggregation data table stored on the storage, the aggregation data table listing content stored on private content delivery network (PCDN) devices of a PCDN; and,
   a PCDN component that is executed by the processor and is configured to:
     receive requests for particular content from the PCDN devices,
     access the aggregation data table to determine whether the particular content is stored within the PCDN, and
     in an instance where the particular content is not stored within the PCDN:
       obtain the particular content from an entity that is external to the PCDN without identifying, to the entity that is external to the PCDN, a particular PCDN device that requested the particular content,
       divide the particular content into blocks,
       store the blocks among different PCDN devices of the PCDN, and
       update the aggregation data table to reflect location of the blocks of the particular content.

6. The system of claim 5, wherein the aggregation data table and the PCDN component are embodied on a single device.

7. The system of claim 6, wherein the single device is one of the PCDN devices.

8. The system of claim 6, wherein the single device has access to another network over which to obtain the particular content.

9. The system of claim 5, wherein the PCDN component functions in a master role and the PCDN devices function in slave roles.

10. The system of claim 9, wherein the PCDN component comprises a first instance of the PCDN component that works cooperatively with another instance of the PCDN component on another PCDN device in a shared master role.

11. A system, comprising:
    a processor; and
    storage storing computer-executable instructions which, when executed by the processor, cause the processor to:
      establish a private content delivery network (PCDN) for devices requesting to join a local area network at a location;
      receive a content request from a requesting device of the PCDN;
      in an instance where the content does not already exist on the PCDN, obtain the content from an external entity without disclosing information about the requesting device to the external entity;
      divide the content into content blocks;
      in a manner that satisfies the content request, initially send some of the content blocks of the content to the requesting device while storing remaining content blocks among multiple other devices of the PCDN; and, subsequently cause the remaining content blocks to be sent to the requesting PCDN device.

12. The system of claim 11, wherein the computer-executable instructions further cause the processor to:

throttle a fetch rate of the content from the external entity while buffering the remaining content blocks among the multiple other devices in a manner that satisfies the content request.

13. The system of claim 11, wherein the PCDN and the devices of the PCDN are controlled by a single entity or wherein at least some of the devices of the PCDN are controlled by a service provider and operated on behalf of the single entity.

14. The system of claim 13, wherein the single entity is a family, or wherein the single entity is an organization.

15. The system of claim 11, wherein the computer-executable instructions further cause the processor to:

analyze user activities on a particular device of the PCDN;

predict future usage based at least in part upon the user activities; and prefetch future content associated with the predicted future usage.

16. The system of claim 11, wherein the computer-executable instructions further cause the processor to:

analyze user activities of an individual user across multiple individual devices of the PCDN;

predict future usage based at least in part upon the user activities; and prefetch future content associated with the predicted future usage.

17. The system of claim 16, wherein the computer-executable instructions further cause the processor to:

store the prefetched future content among the multiple individual devices of the PCDN.

18. The system of claim 11, wherein the PCDN comprises a wireless local area network.

19. The system of claim 11, wherein the PCDN comprises multiple Internet access points.

20. The system of claim 19, wherein the multiple Internet access points include at least one physical Internet access point and at least one cellular Internet access point.

* * * * *